United States Patent
Hsu

(10) Patent No.: US 9,319,829 B1
(45) Date of Patent: Apr. 19, 2016

(54) WIRELESS INDUCTIVE POINTER CLOCK

(71) Applicant: Hua Wen Hsu, Taipei (TW)

(72) Inventor: Hua Wen Hsu, Taipei (TW)

( * ) Notice: Subject to any disclaimer, the term of this patent is extended or adjusted under 35 U.S.C. 154(b) by 0 days.

(21) Appl. No.: 14/528,084

(22) Filed: Oct. 30, 2014

(51) Int. Cl.
| | |
|---|---|
| *G04C 13/00* | (2006.01) |
| *G04C 23/00* | (2006.01) |
| *H04W 4/00* | (2009.01) |
| *G04R 20/26* | (2013.01) |
| *G04C 13/02* | (2006.01) |
| *G04C 11/04* | (2006.01) |

(52) U.S. Cl.
CPC ............. *H04W 4/008* (2013.01); *G04C 11/04* (2013.01); *G04C 13/023* (2013.01); *G04C 13/027* (2013.01); *G04R 20/26* (2013.01)

(58) Field of Classification Search
None
See application file for complete search history.

(56) References Cited

U.S. PATENT DOCUMENTS

| | | | | | |
|---|---|---|---|---|---|
| 5,810,245 | A * | 9/1998 | Heitman | ............ | F24F 11/0076 165/208 |
| 8,542,170 | B2 * | 9/2013 | Guo | ............ | G09G 3/2092 345/87 |
| 2002/0006080 | A1 * | 1/2002 | Shimizu | ............ | G04C 3/146 368/73 |
| 2005/0259722 | A1 * | 11/2005 | Vanlonden | ............ | H04B 15/04 375/145 |
| 2006/0239127 | A1 * | 10/2006 | Wu | ............ | G04G 9/00 368/276 |
| 2007/0076528 | A1 * | 4/2007 | Kirby | ............ | G04F 10/00 368/47 |
| 2008/0212416 | A1 * | 9/2008 | Polonio | ............ | G04G 5/002 368/244 |
| 2010/0112964 | A1 * | 5/2010 | Yi | ............ | G04C 21/04 455/90.3 |
| 2010/0182046 | A1 * | 7/2010 | Otsuga | ............ | G06F 1/12 326/93 |
| 2011/0250902 | A1 * | 10/2011 | Huang | ............ | H04W 4/021 455/456.1 |
| 2011/0301767 | A1 * | 12/2011 | Alexanian | ............ | A01G 25/16 700/284 |
| 2012/0287760 | A1 * | 11/2012 | Ogasawara | ............ | G04C 3/143 368/80 |

\* cited by examiner

*Primary Examiner* — Dominic E Rego

(57) ABSTRACT

A wireless inductive pointer clock includes a wireless inductive receiver module for receiving a time code, a control circuit module electrically coupled to the wireless inductive receiver module for receiving the time code and converting the time code into a pointer drive signal, a movement electrically coupled to the control circuit module for receiving the pointer drive signal and driving by the control circuit module, and a pointer unit including a plurality of pointers drivable by the movement. The wireless inductive receiver module can receive the time code (hour, minute, second) of a smart phone or tablet computer, enabling the control circuit module to drive the movement and the pointers of the pointer unit so that the time on the wireless inductive pointer clock can be automatically synchronized to the time on the smart phone or tablet.

9 Claims, 3 Drawing Sheets

US 9,319,829 B1

WIRELESS INDUCTIVE POINTER CLOCK

BACKGROUND OF THE INVENTION

1. Field of the Invention

The present invention relates to clock technology and more particularly, to a wireless inductive pointer clock, which can be automatically synchronized to the time on a smart phone or tablet computer upon approaching of the smart phone or tablet computer.

2. Description of the Related Art

A conventional pointer clock generally comprises a dial, a movement, and three hands (the hour hand, the minute hand and the second hand). The second hand, the minute hand and the hour hand are pivotally coupled to the movement, and driven by the movement to indicate the time measured.

Commercial pointer clocks use different appearance designs or dial patterns to attract consumers. However, correcting the position of the hour hand, minute hand or second hand of a conventional pointer clock can simply be achieved manually. When wishing to correct the time on a pointer clock, the user needs to remove the pointer clock from the wall for correction. After correction, the user needs to hang the pointer clock on the wall again. It is very inconvenient to adjust the indication of time in a conventional pointer clock.

Further, a radio-controlled clock is synchronized by a time code transmitted by a radio transmitter connected to an atomic clock. However, the use of a radio-controlled clock may encounter problems. If a radio-controlled clock is used in a zone between two transmitters, it sometimes picks up one signal and sometimes another. Further, a radio-controlled clock may be unable to accurately receive the time code transmitted by a radio transmitter due to environmental interferences.

SUMMARY OF THE INVENTION

The present invention has been accomplished under the circumstances in view. It is therefore the main object of the present invention to provide a wireless inductive pointer clock, which uses a wireless inductive receiver module to receive the time code of an electronic information device in a wireless manner, enabling the time on the wireless inductive pointer clock to be automatically synchronized to the time on the electronic information device.

To achieve this and other objects of the present invention, a wireless inductive pointer clock of the invention comprises a wireless inductive receiver module adapted for receiving a time code, a control circuit module electrically coupled to the wireless inductive receiver module and adapted for receiving the time code from the wireless inductive receiver module and converting the time code into a pointer drive signal, a movement electrically coupled to the control circuit module and adapted for receiving the pointer drive signal from the control circuit module and driving by the control circuit module, and a pointer unit comprising a plurality of pointers drivable by the movement.

When approaching an electronic information device, such as smart phone or tablet computer to the wireless inductive pointer clock, the wireless inductive receiver module of the wireless inductive pointer clock receives the time code (hour, minute, second) of the electronic information device, enabling the control circuit module to drive the movement and the pointers of the pointer unit so that the time on the wireless inductive pointer clock is automatically synchronized to the time on the smart phone or tablet.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
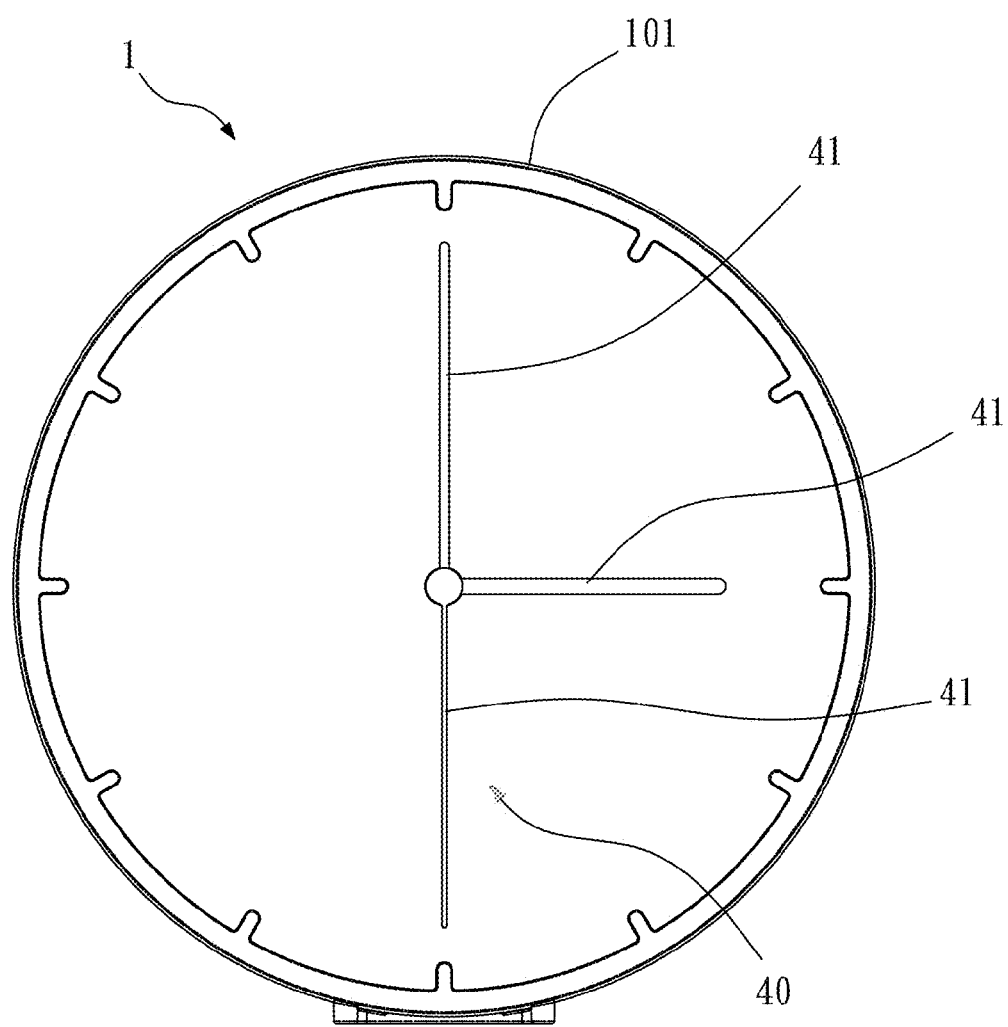
FIG. 1 is a schematic front view of a wireless inductive pointer clock in accordance with the present invention.
Figure 2:
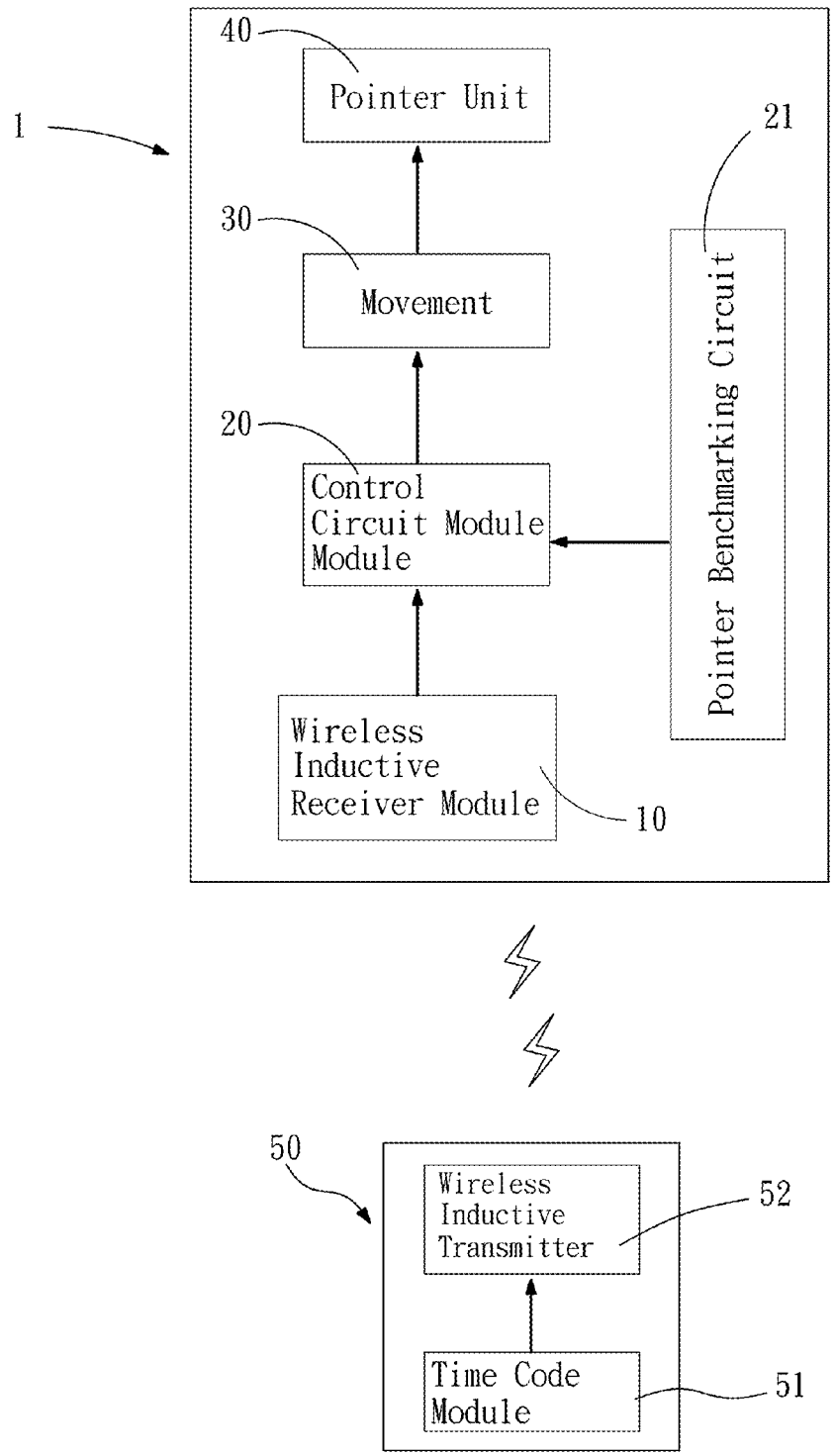
FIG. 2 is a system block illustrating the wireless inductive pointer clock in operation with an electronic information device in accordance with the present invention.
Figure 3:
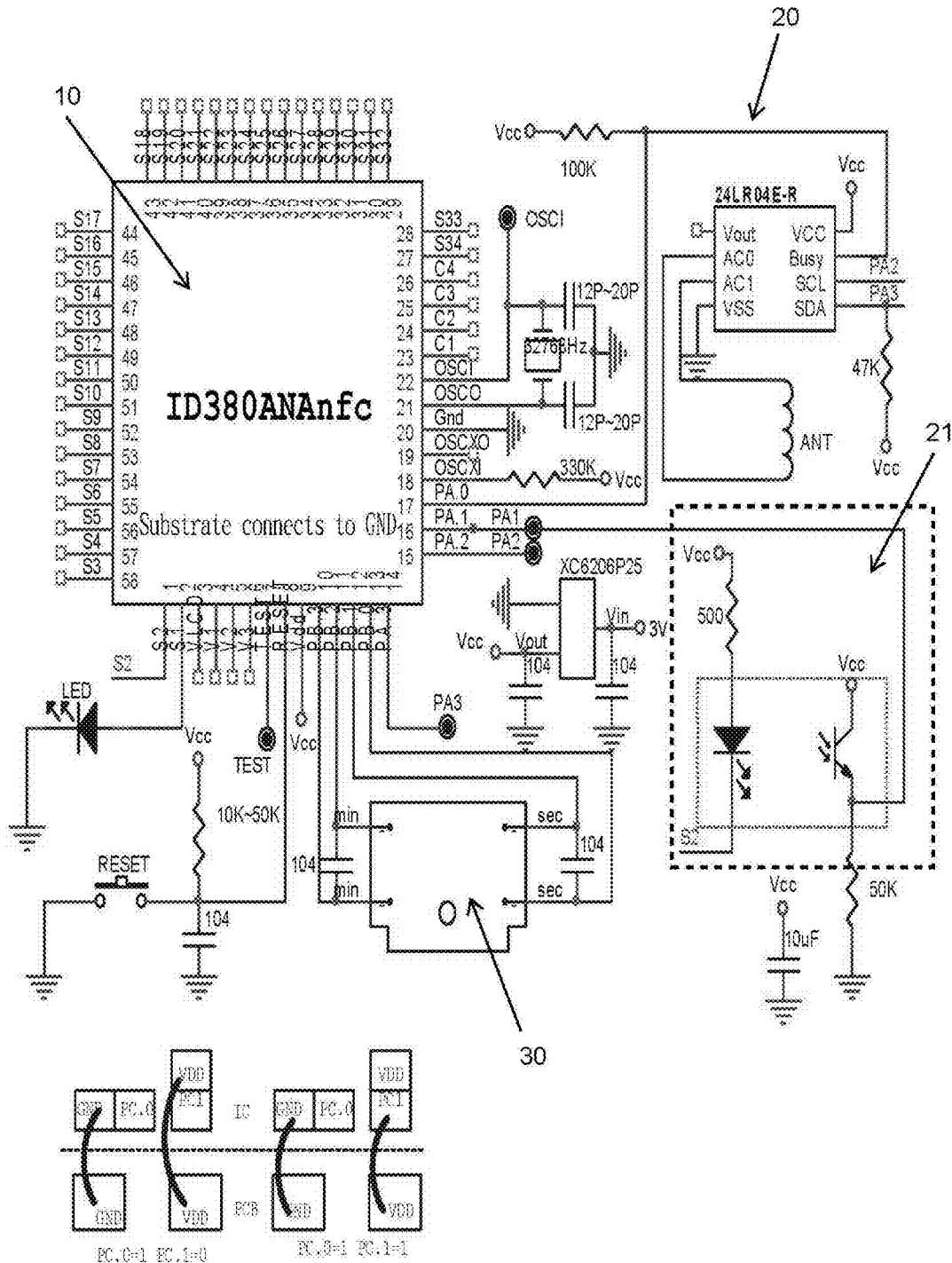
FIG. 3 is a circuit diagram of the wireless inductive pointer clock in accordance with the present invention.

Referring to FIGS. 1-3, a wireless inductive pointer clock 1 in accordance with the present invention is shown. The wireless inductive pointer clock 1 comprises a wireless inductive receiver module 10 adapted for receiving a time code signal wirelessly, a control circuit module 20 electrically connected with the wireless inductive receiver module 10 and adapted for receiving and processing the time code signal from the wireless inductive receiver module 10 and converting it into a pointer drive signal, a movement 30 electrically connected with the control circuit module 20 and adapted for receiving the pointer drive signal from the control circuit module 20 and driving by the control circuit module 20, and a pointer unit 40, which comprises a plurality of pointers 41 drivable by the movement 30.

Referring to FIGS. 2 and 3 again, an electronic information device 50 is used for allowing the user to control the settings of the wireless inductive pointer clock 1. The electronic information device 50 can be a smart phone, tablet computer, or any of a variety of other mobile electronic devices.

The electronic information device 50 comprises a time code module 51, and a wireless inductive transmitter module 52. The time code module 51 can be a smart phone application software, comprising a time code (hour, minute, second) stored in the electronic information device 50. If the time code stored in the electronic information device 50 is not the standard time on one specific time zone, the user needs to use the time code module 51 for setting the time code to become the standard time so that the wireless inductive pointer clock 1 can be tuned to the standard time. The wireless inductive transmitter module 52 is electrically connected to the time code module 51 for sending out the time code provided by the time code module 51. Further, the wireless inductive transmitter module 52 matches with the wireless inductive receiver module 10 of the wireless inductive pointer clock 1 for the transmission of the time code in a wireless manner.

In application, operate the electronic information device 50 to input a time code (hour, minute, second) and to send out the inputted time code in a wireless manner. The transmitted time code (hour, minute, second) is then received by the wireless inductive receiver module 10 wirelessly. Upon receipt of the time code, the wireless inductive receiver module 10 provides the time code to the control circuit module 20 for processing, causing the control circuit module 20 to drive the movement 30 of the pointer clock 1 in moving the pointers 41 of the pointer unit 40 to the set position. Thus, the user can correct the time on the wireless inductive pointer clock 1 by means of the electronic information device 50 conveniently in a wireless manner without touching the wireless inductive pointer clock 1, or removing the wireless inductive pointer clock 1 from the wall.

Referring to FIGS. 1 and 2 again, in one embodiment of the present invention, the wireless inductive pointer clock 1 comprises a housing 101 that defines therein an accommodation chamber for accommodating the wireless inductive receiver module 10, the control circuit module 20, the movement 30 and the pointer unit 40. Further, the housing 101 can be variously configured, providing a decorative design to attract people's eyes.

Referring to FIGS. 2 and 3 again, in the present preferred embodiment, the wireless inductive receiver module 10 employs NFC (Near Field Communication) technology. However, this configuration is not a limitation. In other embodiments of the present invention, the wireless inductive receiver module 10 can be configured subject to Bluetooth, WiFi or ZigBee specifications.

As stated above, the invention uses the pointer drive signal of the control circuit module 20 to drive the pointers 41 of the pointer unit 40 to the respective set positions subject to the time code provided by the electronic information device 50. During the operation, the control circuit module 20 resets the pointers 41 to the reference position, for example, 12 o'clock position (any hours position from 1 through 12 can be selectively used as the reference position), and computes the time code through a parameter calculation to generate a pointer drive signal for driving the pointers 41 to the correct time position.

Therefore, the wireless inductive pointer clock 1 further comprises a pointer benchmarking circuit 21 electrically coupled to the control circuit module 20 for generating a positioning signal when the control circuit module 20 resets the pointers 41 to the reference position. After received the positioning signal from the pointer benchmarking circuit 21, the control circuit module 20 computes the time code and then generates a pointer drive signal to drive the pointers 41 of the pointer unit 40 to the respective set positions, and thus, the time on the wireless inductive pointer clock 1 is synchronized to the time on the electronic information device 50. The aforesaid reference position can be any hours position from 1 through 12.

Thus, the wireless inductive pointer clock of the invention has the features and advantages as follows:

1. When kept in proximity to the wireless inductive transmitter module, such as the NFC antenna induction zone, of the smart phone or tablet computer, the time on the wireless inductive pointer clock is automatically synchronized to the time on the smart phone or tablet computer, and thus the time indication of the wireless inductive pointer clock can be automatically corrected without removal from the wall.

2. Low cost, easy processing, power saving, no RF production certification trouble.

3. When approaching the electronic information device (smart phone or tablet computer) to the wireless inductive pointer clock, the time on the wireless inductive pointer clock is synchronized to the time on the electronic information device, eliminating the problems of the use of a radio-controlled clock that is synchronized by a time code transmitted by a radio transmitter connected to an atomic clock.

In conclusion, the wireless inductive pointer clock of the invention uses the wireless inductive receiver module to receive a time code from an electronic information device in a wireless manner, and the control circuit module to control the positioning of the pointers, and thus, the time on the wireless inductive pointer clock can be automatically synchronized to the time on the electronic information device.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. A wireless inductive pointer clock, comprising:
a wireless inductive receiver module adapted for receiving a time code;
a control circuit module electrically coupled to said wireless inductive receiver module and adapted for receiving said time code from said wireless inductive receiver module and converting said time code into a pointer drive signal;
a movement electrically coupled to said control circuit module and adapted for receiving said pointer drive signal from said control circuit module and driving by said control circuit module; and
a pointer unit comprising a plurality of pointers drivable by said movement,
wherein said wireless inductive pointer clock further comprises a pointer benchmarking circuit electrically coupled to said control circuit module for generating a positioning signal when said control circuit module resets said pointers of said pointer unit, said control circuit module computing said time code and then generating said pointer drive signal to drive said pointers of said pointer unit after received said positioning signal from said pointer benchmarking circuit.

2. The wireless inductive pointer clock as claimed in claim 1, further comprising an electronic information device adapted to provide said time code to said wireless inductive receiver module in a wireless manner.

3. The wireless inductive pointer clock as claimed in claim 2, wherein said electronic information device is selected from the group of smart phones and tablet computers.

4. The wireless inductive pointer clock as claimed in claim 3, wherein said electronic information device comprises a time code module having stored therein said time code, and a wireless inductive transmitter module electrically coupled with said time code module and adapted for transmitting said time code to said wireless inductive receiver module in a wireless manner.

5. The wireless inductive pointer clock as claimed in claim 4, wherein said time code module is a smart phone application software adapted for setting said time code as a standard time.

6. The wireless inductive pointer clock as claimed in claim 4, wherein said wireless inductive transmitter module of said electronic information device matches with said wireless inductive receiver module of said wireless inductive pointer clock for the transmission of said time code.

7. The wireless inductive pointer clock as claimed in claim 1, further comprising a housing, said housing defining therein an accommodation chamber adapted for accommodating said wireless inductive receiver module, said control circuit module, said movement and said pointer unit.

8. The wireless inductive pointer clock as claimed in claim 1, wherein said wireless inductive receiver module is configured subject to one of NFC (Near Field Communication), Bluetooth, WiFi and ZigBee specifications.

9. The wireless inductive pointer clock as claimed in claim 1, wherein said pointer reference position is one of the hours positions from 1 through 12.

* * * * *